(12) United States Patent
Chittim

(10) Patent No.: US 12,209,706 B2
(45) Date of Patent: Jan. 28, 2025

(54) COMPOSITE STORAGE TANK SYSTEM FOR GASEOUS HYDROGEN

(71) Applicant: ROLLS-ROYCE plc, London (GB)

(72) Inventor: Sophie Chittim, Burton on Trent (GB)

(73) Assignee: Rolls-Royce PLC, London (GB)

( * ) Notice: Subject to any disclaimer, the term of this patent is extended or adjusted under 35 U.S.C. 154(b) by 651 days.

(21) Appl. No.: 17/470,527

(22) Filed: Sep. 9, 2021

(65) Prior Publication Data

US 2022/0099252 A1 Mar. 31, 2022

(30) Foreign Application Priority Data

Sep. 28, 2020 (GB) .................................... 2015295

(51) Int. Cl.
| | |
|---|---|
| *F17C 11/00* | (2006.01) |
| *C01B 6/24* | (2006.01) |
| *H01M 8/04082* | (2016.01) |
| *H01M 8/10* | (2016.01) |

(52) U.S. Cl.
CPC .............. *F17C 11/005* (2013.01); *C01B 6/24* (2013.01); *C01B 6/243* (2013.01); *H01M 8/04201* (2013.01); *F17C 2201/0109* (2013.01); *F17C 2203/0604* (2013.01); *F17C 2203/0636* (2013.01); *F17C 2203/0658* (2013.01); *F17C 2221/012* (2013.01);
(Continued)

(58) Field of Classification Search
CPC ... H01M 8/04; H01M 8/04201; F17C 11/005; C01B 6/24; C01B 6/243
See application file for complete search history.

(56) References Cited

U.S. PATENT DOCUMENTS

| | | |
|---|---|---|
| 3,921,844 A | 11/1975 | Walles |
| 6,382,232 B1 | 5/2002 | Portmann |
| 2005/0220252 A1 | 10/2005 | Tashiro et al. |

(Continued)

FOREIGN PATENT DOCUMENTS

| | | | | |
|---|---|---|---|---|
| DE | 102010033599 A1 * | 2/2012 | ................ | F17C 1/06 |
| DE | 102014003587 A1 | 9/2015 | | |

(Continued)

OTHER PUBLICATIONS

Great Britain search report dated Mar. 8, 2021, issued in GB Patent Application No. 2015295.5.
(Continued)

*Primary Examiner* — Karie O'Neill Apicella

(57) ABSTRACT

A composite storage tank system for gaseous hydrogen comprises a composite storage tank having composite wall enclosing a gas storage volume, the composite wall including a metal hydride element, or a metal element capable of forming a metal hydride in the presence of hydrogen, the system further comprising measuring apparatus arranged to measure an electrical characteristic of the metal hydride element or the metal element. The history of leakage of gaseous hydrogen from the tank, the current rate of leakage and the physical condition of the composite wall in the vicinity of the metal or metal hydride element may be inferred from a measurement of the electrical characteristic, without taking the tank out of service as is required in the case of known leaks tests such as a vacuum test, helium leak test or hydrogen sniffing test.

12 Claims, 2 Drawing Sheets

(52) U.S. Cl.
CPC ............ *F17C 2250/0404* (2013.01); *F17C 2270/0189* (2013.01); *H01M 2008/1095* (2013.01); *H01M 2250/20* (2013.01)

(56) References Cited

U.S. PATENT DOCUMENTS

| | | |
|---|---|---|
| 2013/0082066 A1 | 4/2013 | Prakash et al. |
| 2018/0274725 A1 | 9/2018 | Chung et al. |
| 2020/0223691 A1* | 7/2020 | Huang .............. H01M 8/04216 |

FOREIGN PATENT DOCUMENTS

| | | |
|---|---|---|
| FR | 2976045 A1 | 12/2012 |
| WO | 2012016657 A1 | 2/2012 |

OTHER PUBLICATIONS

European Search report dated Feb. 8, 2022, issued in EP Patent Application No. EP21192936.

* cited by examiner

COMPOSITE STORAGE TANK SYSTEM FOR GASEOUS HYDROGEN

CROSS-REFERENCE TO RELATED PATENT APPLICATIONS

This application is based upon and claims the benefit of priority from British Patent Application No. GB 2015295.5, filed on Sep. 28, 2020, the entire contents of which are herein incorporated by reference.

BACKGROUND

Technical Field

The disclosure relates to composite storage tank systems for storing gaseous hydrogen at high pressure, for example 300 bar or greater.

Description of Related Art

Organic matrix composite storage tanks for storing gaseous hydrogen at high pressure are of interest for hydrogen-powered transport applications (road, rail, aerospace) in which motive power is provided by proton-exchange membrane (PEM) fuel cells. Motive power in aerospace applications could alternatively or additionally be provided by one or more hydrogen-burning gas turbine engines. Organic matrix composite storage tanks are especially attractive for gaseous hydrogen storage in aerospace applications owing to their potential for achieving high gravimetric efficiencies of 10% or more. A so-called 'Type IV' tank comprises a carbon fibre composite wall, or shell, and a polymer liner (e.g. of polypropylene or polyethylene); a 'Type V' tank comprises a carbon fibre composite wall but does not have a polymer liner.

When a composite storage tank is used to store hydrogen, the stored hydrogen tends to leak through the composite wall, and the liner if present, due to the very small size a hydrogen molecule (0.12 nm). The rate at which hydrogen leaks through the composite wall of a composite storage tank tends to increase over time with use of the tank because repeated charging and discharging cause microcracking and delamination within the composite shell. In order to reduce wastage of gaseous hydrogen fuel within the tank, it is desirable to be able to find the rate at which hydrogen leaks from a tank during use and/or how much hydrogen has leaked from the tank over time. The tank can then be removed from service and replaced when the rate of leakage exceeds a threshold. Presently, composite tanks used in transport applications (typically automotive applications) provide no means for measuring the rate at which hydrogen leaks from a tank, or how much hydrogen has leaked over time, or for establishing an indication of the physical condition of the composite wall of the tank. The rate of leakage of a tank can only be found presently by taking the tank out of service and subjecting it to a known test, for example a helium leak test, vacuum test or hydrogen sensor (sniffing) test. In these tests the tank is removed from service even if its performance and condition are subsequently found to be satisfactory. Chemo-chromic indicators can provide an indication of the simple fact of leakage of gaseous hydrogen from a tank, but do not provide information on the current rate of leakage or historical leakage from the tank.

SUMMARY

According to an example, a composite storage tank system for gaseous hydrogen comprises a composite storage tank having a composite wall enclosing a gas storage volume, the composite wall including either a metal hydride element, or a metal element capable of forming a metal hydride in the presence of hydrogen, the system further comprising measuring apparatus arranged to measure an electrical characteristic of the metal hydride element or the metal element. The extent of historical leakage of hydrogen from the tank, and its current physical condition, at the position of the metal or metal hydride element, may be inferred from an electrical characteristic of the metal or metal hydride element, for example its electrical resistance or dielectric constant.

The composite wall may comprise an organic resin, with the metal or metal hydride element being included within the resin.

The composite wall may be an organic matrix composite wall including carbon fibre material, the metal or metal hydride element being included within the carbon fibre material.

If the composite wall includes a metal hydride element, the metal of the metal hydride element may include an alkali metal or an alkaline earth metal or a mixed metal. In the case of an alkali metal, the metal hydride of the metal hydride element may comprise at least one of $LiAlD_2$, $Li_3AlD_6$, $NaAlD_4$, $Na_3AlD_6$ $KAlD_4$, $RbAlD_4$ and $CsAlD_4$. In the case of an alkaline-earth metal, the metal hydride of the metal hydride element may comprise at least one of $Mg(AlD_4)_2$, $Ca(AlD_4)_2$, $CaAlD_5$, $SrAlD_5$, $BaAlD_5$, $SrAl_2D_2$, $Sr_2AlD_7$ and $Ba_2AlD_7$. In the case of a mixed metal, the metal hydride of the metal hydride element may comprise at least one of $Na_2LiAlD_6$, $LiMgAlD_6$ and $LiMg(AlD_4)_3$.

The composite storage tank of the composite storage system may include a polymer liner in contact with the interior surface of the composite wall.

The composite storage tank may further comprise first and second electrical contacts which are in contact with the metal or metal hydride element at respective positions and accessible from the exterior of the composite storage tank, thus allowing the electrical resistance between the contacts to be measured.

The measuring apparatus may be arranged to measure the electrical resistance or the dielectric constant of the metal or metal hydride element.

According to an example, an aircraft comprises a composite storage tank system as described herein and either a polymer electrolyte membrane (PEM) fuel cell or a hydrogen-burning gas turbine engine, the PEM fuel cell or the gas turbine engine being arranged to receive gaseous hydrogen from the composite storage tank of the composite storage tank system.

For the purposes of this specification, 'hydride' means a hydride compound including one or more isotopes of hydrogen.

DESCRIPTION OF THE DRAWINGS

Examples are described below by way of example only and with reference to the accompanying drawings in which.

DETAILED DESCRIPTION

Figure 1:
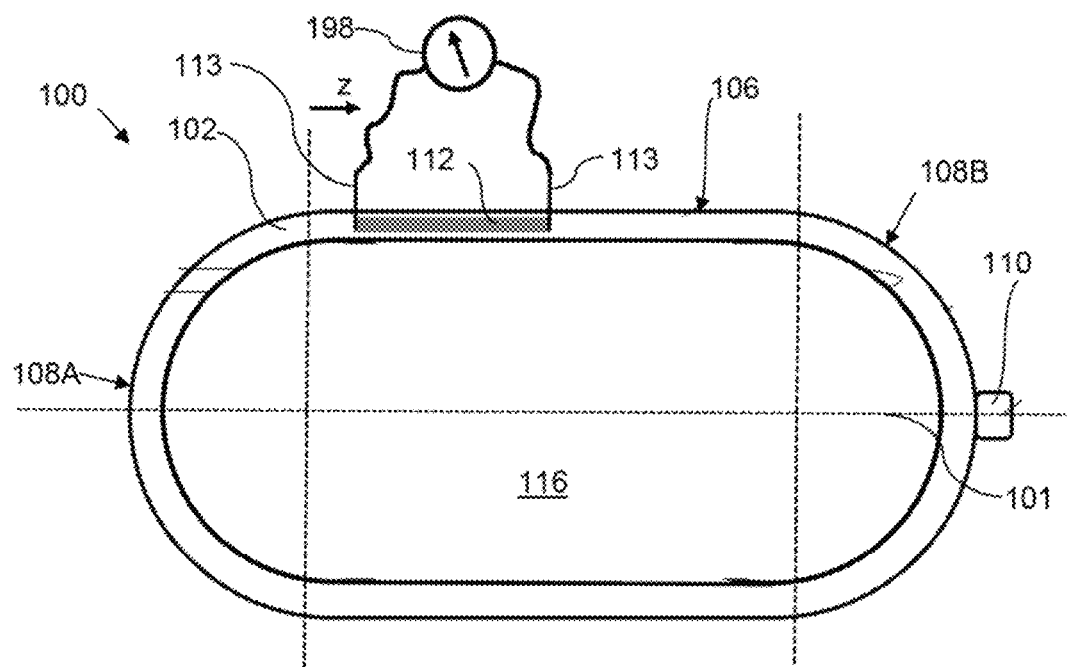
FIG. 1 shows a composite storage tank system of the invention.
Figure 2:
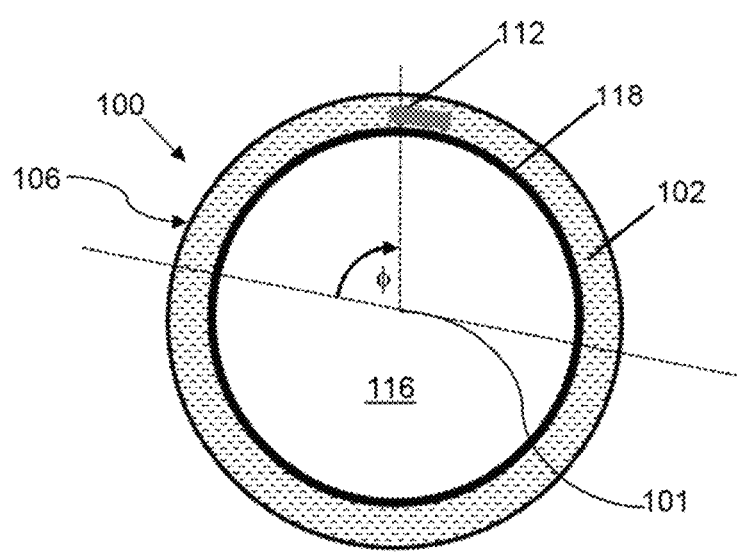
FIG. 2 shows a transverse section of a composite storage tank comprised in the FIG. 1 system.

Referring to FIGS. 1 and 2, a composite storage tank system 100 of the invention comprises an organic matrix composite tank for storing gaseous hydrogen at high pressure (e.g. 300 bar or greater), the tanks comprising an organic matrix composite shell or wall 102 enclosing and defining a gas storage volume 116. The tank has a cylindrical central section 106 defining a central longitudinal axis 101 of the tank and domed or hemispherical end portions 108A, 108B. A metal fitting 110 passes through end portion 108B and allows the tank to be charged with gaseous hydrogen and discharged. A lithium aluminium deuteride element (LiAlD$_2$) 112 is incorporated into the composite wall 102 of the tank, specifically within resin comprised in the wall 102. Electrical contacts 113 contact respective positions on the element 112 and extend to the exterior of the tank, allowing the electrical resistance of the element 112 to be measured or monitored. The system 100 comprises a resistance meter 198, each connecting leads of which is in electrical contact with a respective electrical contact 113. The tank further comprises a polymer liner 118 (not shown in FIG. 1), for example of polyethylene or polypropylene, and is therefore a so-called 'Type IV' tank, although the invention is equally applicable to a 'Type V' tank. The element 112 is at a specific axial position z and azimuthal position □ with respect to the axis 101. A portion of hydrogen leaking through the polymer liner 118 and composite wall 102 in the vicinity of the sample 112 is adsorbed by the element 112 causing its electrical resistance to change. The more hydrogen is adsorbed by the element 112, the greater its electrical resistance. The resistance indicated by the resistance meter 198 therefore provides an indication of the total amount of hydrogen which has leaked from tank in the vicinity of the element 112 when taken together with the original resistance of the element 112. Since the amount of hydrogen which has leaked through the composite wall 102 in the vicinity of the sample 112 depends inter alia on the extent of microcracking and/or delamination of the composite wall 102, the electrical resistance of the element 112 also provides an indication of the physical condition of the composite wall 102 in the vicinity of the element 112. Since a portion of hydrogen leaking through the composite wall 102 is adsorbed by the element 112, the element 112 serves to reduce leakage to the exterior of the tank in addition to allowing an amount of hydrogen leaking past the element 112 and the physical condition of the composite wall 102 in the vicinity of the element 112 to be determined.

Figure 3:
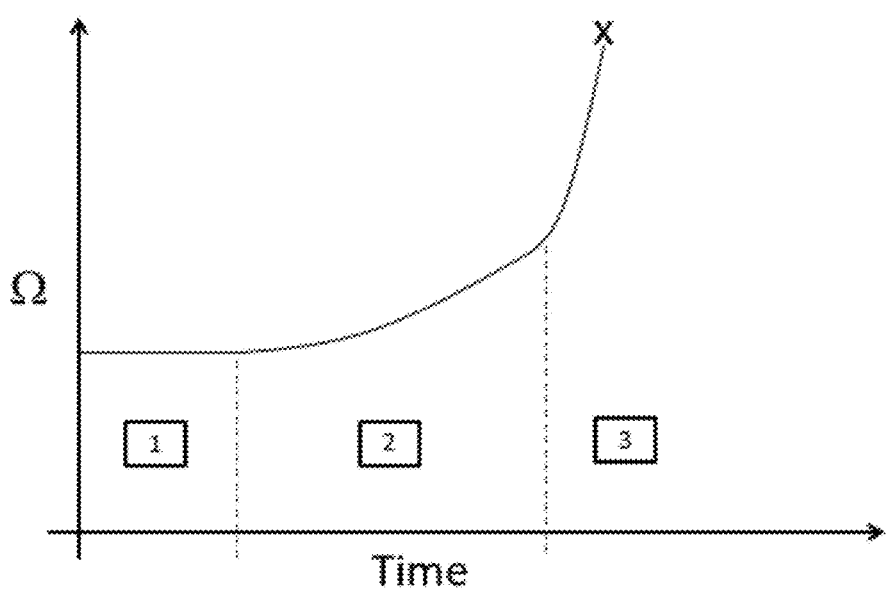
FIG. 3 illustrates a change in resistance of a metal hydride element comprised in a composite storage tank of the FIG. 1 system as a function of time.

FIG. 3 illustrates one possible example form for the change in electrical resistance of the element 112 overtime. In a first time period 1, the tank does not leak in the vicinity of the element 112 and the electrical resistance of the element 112 is therefore constant over the period 1. At the end of time period 1, the liner 118 and composite wall 102 begin to leak at a first rate over a time period 2 and the electrical resistance of the element 112 increases with time as it adsorbs hydrogen at a rate corresponding to the first rate. At the end of the time period 2, increased physical degradation of the composite wall 102 in the vicinity of the element 112 (e.g. microcracking and/or delamination) caused by charging and discharging of the tank causes the rate of hydrogen leakage to increase to a second rate greater than the first rate over a time period 3 and consequently the rate of change of the electrical resistance of the element 112 increases more quickly than is the case in time period 2. The electrical resistance corresponding to a point X, at the end of time period 3, corresponds to the total amount of gaseous hydrogen that has leaked from the tank 100 from t=0 up to the end of period 3 and also to the physical condition of the composite wall 102 at the time corresponding to point X in the vicinity of the element 112.

If no physical degradation of the composite wall 102 occurs, then the increase in electrical resistance of the sample 112 results entirely from background leakage due to the very small size of the hydrogen molecule, and if desired the electrical resistance of the element may be restored or reset to its value at t=0 by heating the element 112 to evolve gaseous hydrogen which has been adsorbed during the time periods 1, 2 and 3.

In another embodiment, multiple hydride/metal elements may be included at different axial and azimuthal positions in the composite wall of a composite storage tank in order to allow estimation of historical hydrogen leakage and wall condition at multiple positions in the composite wall of the composite storage tank.

In a further embodiment of the invention, a hydride, or a metal capable forming a hydride in the presence of gaseous hydrogen, is integrated in the composite wall of an organic composite gaseous hydrogen storage tank by including the hydride or metal within a carbon fibre winding during manufacture of the tank. The angle of the winding during manufacture of the tank is aligned with carbon fibres of the winding to prevent stresses that could arise due to different thermal expansion coefficients of the hydride or metal and the carbon fibre. By incorporating a hydride or metal within a carbon fibre winding during tank manufacture, leakage of hydrogen at all or almost all positions in the composite wall of the finished tank may be detected, and an estimate of the overall physical condition of the composite wall at all or almost all positions within the wall may be made.

A still further embodiment of the invention comprises a composite storage tank similar to that of FIGS. 1 and 2, except that the electrical contacts 113 are omitted and the dielectric constant of a hydride or metal element comprised in the composite wall of the tank is measured in order to determine the amount of hydrogen which has been adsorbed by the element. For example, a capacitive structure including the hydride/metal element could be formed and the capacitance of the structure measured in order to determine the dielectric constant of the hydride/metal element.

What is claimed is:

1. A composite storage tank system for gaseous hydrogen, the system comprising a composite storage tank having a composite wall enclosing a gas storage volume, the composite wall including either a metal hydride element, or a metal element capable of forming a metal hydride in the presence of hydrogen, the system further comprising an electrical characteristic measuring apparatus connected to the metal hydride element or the metal element capable of forming a metal hydride in the presence of hydrogen.

2. A composite storage tank system according to claim 1, wherein the composite wall comprises an organic resin and the metal hydride element, or as the case may be the metal element, is included within the resin.

3. A composite storage tank system according to claim 1, wherein the composite wall is an organic matrix composite wall including carbon fibre material, and wherein the metal hydride element, or as the case may be the metal element, is included within the carbon fibre material.

4. A composite storage tank system according to claim 1, wherein the composite wall includes a metal hydride element, the metal of the metal hydride element including an alkali metal or an alkaline earth metal or a mixed metal.

5. A composite storage tank system according to claim 4, wherein the composite wall includes a metal hydride element, the metal hydride of the metal hydride element comprising at least one of LiAlD2, Li3AlD6, NaAlD4, Na3AlD6, KAlD4, RbAlD4 and CsAlD4.

6. A composite storage tank system according to claim 4, wherein the composite wall includes a metal hydride element, the metal hydride of the metal hydride element comprising at least one of $Mg(AlD_4)_2$, $Ca(AlD_4)_2$, $CaAlD_5$, $SrAlD_5$, $BaAlD_5$, $SrAl_2D_2$, $Sr_2AlD_7$ and $Ba_2AlD_7$.

7. A composite storage tank system according to claim 4, wherein the composite wall includes a metal hydride element, the metal hydride of the metal hydride element comprising at least one of $Na_2LiAlD_6$, $LiMgAlD_6$ and $LiMg(AlD_4)_3$.

8. A composite storage tank system according to claim 1, wherein the composite storage tank includes a polymer liner in contact with the interior surface of the composite wall of the composite storage tank.

9. A composite storage tank system according to claim 1, and further comprising first and second electrical contacts which are attached to the electrical characteristic measuring apparatus, in contact with the metal or metal hydride element at respective positions, and accessible from the exterior of the composite storage tank.

10. A composite storage tank system according to claim 1, wherein the electrical characteristic measuring apparatus is an electrical resistance meter.

11. A composite storage tank system according to claim 1, wherein the electrical characteristic measuring apparatus is a dielectric constant measurement apparatus.

12. An aircraft comprising a composite storage tank system according to claim 1, and either a polymer electrolyte membrane (PEM) fuel cell or a hydrogen-burning gas turbine engine, the PEM fuel cell or the hydrogen-burning gas turbine engine being arranged to receive gaseous hydrogen from the composite storage tank of the composite storage tank system.

* * * * *